(12) United States Patent
Nakai

(10) Patent No.: US 10,501,029 B2
(45) Date of Patent: Dec. 10, 2019

(54) WIRE HARNESS

(71) Applicant: SUMITOMO WIRING SYSTEMS, LTD., Yokkaichi-shi, Mie (JP)

(72) Inventor: Hirokazu Nakai, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 16/475,198

(22) PCT Filed: Dec. 27, 2017

(86) PCT No.: PCT/JP2017/046896
§ 371 (c)(1),
(2) Date: Jul. 1, 2019

(87) PCT Pub. No.: WO2018/131483
PCT Pub. Date: Jul. 19, 2018

(65) Prior Publication Data
US 2019/0337472 A1    Nov. 7, 2019

(30) Foreign Application Priority Data

Jan. 12, 2017  (JP) .................................. 2017-003619
Feb. 27, 2017  (JP) .................................. 2017-034946

(51) Int. Cl.
| | | |
|---|---|---|
| *H01R 4/60* | (2006.01) | |
| *B60R 16/02* | (2006.01) | |
| *H01B 7/06* | (2006.01) | |
| *H01R 4/02* | (2006.01) | |
| *H01B 5/02* | (2006.01) | |

(52) U.S. Cl.
CPC ........... *B60R 16/0207* (2013.01); *H01B 7/06* (2013.01); *H01R 4/02* (2013.01); *H01R 4/60* (2013.01); *H01B 5/02* (2013.01)

(58) Field of Classification Search
CPC ........ B60R 16/0207; H01R 4/02; H01R 4/60; H01B 7/06; H01B 5/02
USPC ....................................................... 174/72 A
See application file for complete search history.

(56) References Cited

U.S. PATENT DOCUMENTS 5,278,354 A  *  1/1994  Lhomme .................. H01R 4/72
                                                174/84 C
6,658,735 B2 * 12/2003  Ito ......................... H01R 4/183
                                                174/84 C
(Continued)

FOREIGN PATENT DOCUMENTS

| JP | S58-157981 U | 10/1983 |
|---|---|---|
| JP | S59-033767 A | 2/1984 |
| JP | H01-115123 U | 8/1989 |

(Continued)

OTHER PUBLICATIONS

Dec. 27, 2017 International Search Report issued in International Patent Application No. PCT/JP2017/046896.

*Primary Examiner* — Sherman Ng
(74) *Attorney, Agent, or Firm* — Oliff PLC

(57) ABSTRACT

A wire harness that can be arranged in a vehicle, the wire harness including: a cylindrical conductor whose first end is electrically connected to a first flexible conductor that is flexible; and a tubular conductor that is electrically connected to the cylindrical conductor in a state in which a second end of the cylindrical conductor is fitted into an opening at a first end of the tubular conductor.

8 Claims, 7 Drawing Sheets

(56) References Cited

U.S. PATENT DOCUMENTS

| | | | | |
|---|---|---|---|---|
| 2009/0229880 A1* | 9/2009 | Watanabe | ............. | H01R 4/183 |
| | | | | 174/72 A |
| 2016/0071630 A1* | 3/2016 | Sugino | ............... | H02G 15/1806 |
| | | | | 174/68.3 |

FOREIGN PATENT DOCUMENTS

| JP | 2001-068244 A | 3/2001 |
|---|---|---|
| JP | 2008-141858 A | 6/2008 |
| JP | 2015-035276 A | 2/2015 |

\* cited by examiner

WIRE HARNESS

This application is the U.S. National. Phase of PCT/JP2017/046896 filed Dec. 27, 2017, which claims priority to JP 2017-003619 filed Jan. 12, 2017 and JP 2017-034946 filed Feb. 27, 2017, the entire disclosures of which are incorporated herein by reference.

BACKGROUND

The present disclosure relates to a wire harness.

Conventional drive motor-attached vehicles such as hybrid cars and electric vehicles, as shown in JP 2016-58137A for example, include a drive motor, an inverter that is connected to the drive motor, and a high-pressure battery that supplies electric power to the inverter, wherein the inverter and the high-pressure battery are connected to each other via a wire harness including a plurality of electric wires.

SUMMARY

In a wire harness such as that described above, a substantially cylindrical single core wire is used in the case in Which the wire harness can be linearly arranged.

Incidentally, the arrangement positions of an inverter, a high-pressure battery and a drive motor, the distance between an inverter and a high-pressure battery, and/or the distance between an inverter and a drive motor may vary according to the vehicle type. Thus, it is necessary to use dedicated single core wires with different lengths for respective vehicle types. It may be difficult to adjust the length of a single core wire compared with that of a twisted wire.

An exemplary aspect of the disclosure provides a wire harness whose length can be adjusted with ease.

A wire harness according to an exemplary aspect includes a cylindrical conductor whose first end is electrically connected to a first flexible conductor that is flexible; and a tubular conductor that is electrically connected to the cylindrical conductor in a state in which a second end of the cylindrical conductor is fitted into an opening at a first end of the tubular conductor, wherein the first end of the cylindrical conductor is collapsed to form a flat plate shape, an outer face of the flat plate shape has a flat joining face, and the first end of the cylindrical conductor is joined at the flat joining face to a core wire of the first flexible conductor, and the tubular conductor and the cylindrical conductor are configured such that a length of the wire harness is adjustable by changing an insertion depth of the cylindrical conductor into the tubular conductor.

With this configuration, the cylindrical conductor is fitted into the tubular conductor. Thus, it is possible to adjust the length of the assembly of the cylindrical conductor and the tubular conductor, by changing the insertion depth of the cylindrical conductor into the tubular conductor, that is, the overlapping length of the tubular conductor and the cylindrical conductor. Accordingly, the length of the wire harness can be adjusted with ease.

In the above-described wire harness, it is preferable that the first flexible conductor is connected to the first end of the cylindrical conductor, and a second flexible conductor that is flexible and is different from the first flexible conductor, is connected to a second end of the tubular conductor.

With this configuration, both the number of cylindrical conductors and the number of tubular conductors between the first flexible conductor and the second flexible conductor are one. Thus, an increase in the number of parts of the wire harness can be suppressed.

In the above-described wire harness, it is preferable that a connector having a flat joining face to which the second flexible conductor is to be joined is formed at the second end of the tubular conductor.

With this configuration, the second end of the tubular conductor has a flat joining face to which the second flexible conductor is to be joined. Thus, the connection with the twisted wire can be improved.

In the above-described wire harness, it is preferable that an opening at a second end of the tubular conductor is electrically connected to another cylindrical conductor, which is different from the cylindrical conductor, in a state in which a first end of the another cylindrical conductor is fitted into the opening.

With this configuration, cylindrical conductors are arranged respectively at both ends of the tubular conductor. Thus, the length of the assembly of the tubular conductor and the cylindrical conductors can be adjusted at both ends of the tubular conductor. Accordingly; the degree of freedom in the design of the wire harness and/or a vehicle in which the wire harness is arranged can be improved.

In the above-described wire harness, it is preferable that a second flexible conductor, which is different from the first flexible conductor, is connected to a second end of the another cylindrical conductor.

With this configuration, a tubular conductor can be arranged between two cylindrical conductors, between the first flexible conductor and the second flexible conductor.

In the above-described wire harness, it is preferable that the cylindrical conductor is a solid member.

With this configuration, the cylindrical conductor is a solid member. Thus, the structure of the cylindrical conductor can be made simple.

In the above-described wire harness, it is preferable that the cylindrical conductor is a hollow member.

With this configuration, the cylindrical conductor is a hollow member. Thus, the surface area of the cylindrical conductor can be increased, and thus the heat dissipation can be improved.

In the above-described wire harness, it is preferable that another tubular conductor, which is different from the tubular conductor, is arranged between the cylindrical conductor and the first flexible conductor, and the cylindrical conductor and the first flexible conductor are electrically connected to each other in a state in which the first flexible conductor is connected to a first end of the another tubular conductor and the first end of the cylindrical conductor is fitted into an opening at a second end of the another tubular conductor.

With this configuration, a cylindrical conductor can be arranged between two tubular conductors. Thus, the length of the assembly of the tubular conductors and the cylindrical conductor can be adjusted at both ends of the cylindrical conductor. Accordingly, the degree of freedom in the design of the wire harness and/or a vehicle in which the wire harness is arranged can be improved.

According to some modes of the present disclosure, the length of a wire harness can be adjusted with ease. Other modes and advantages of the present disclosure will be apparent from the following description together with drawings showing examples of the technical idea of the present disclosure.

BRIEF OF THE DRAWINGS

DETAILED DESCRIPTION OF EMBODIMENTS

Figure 1:
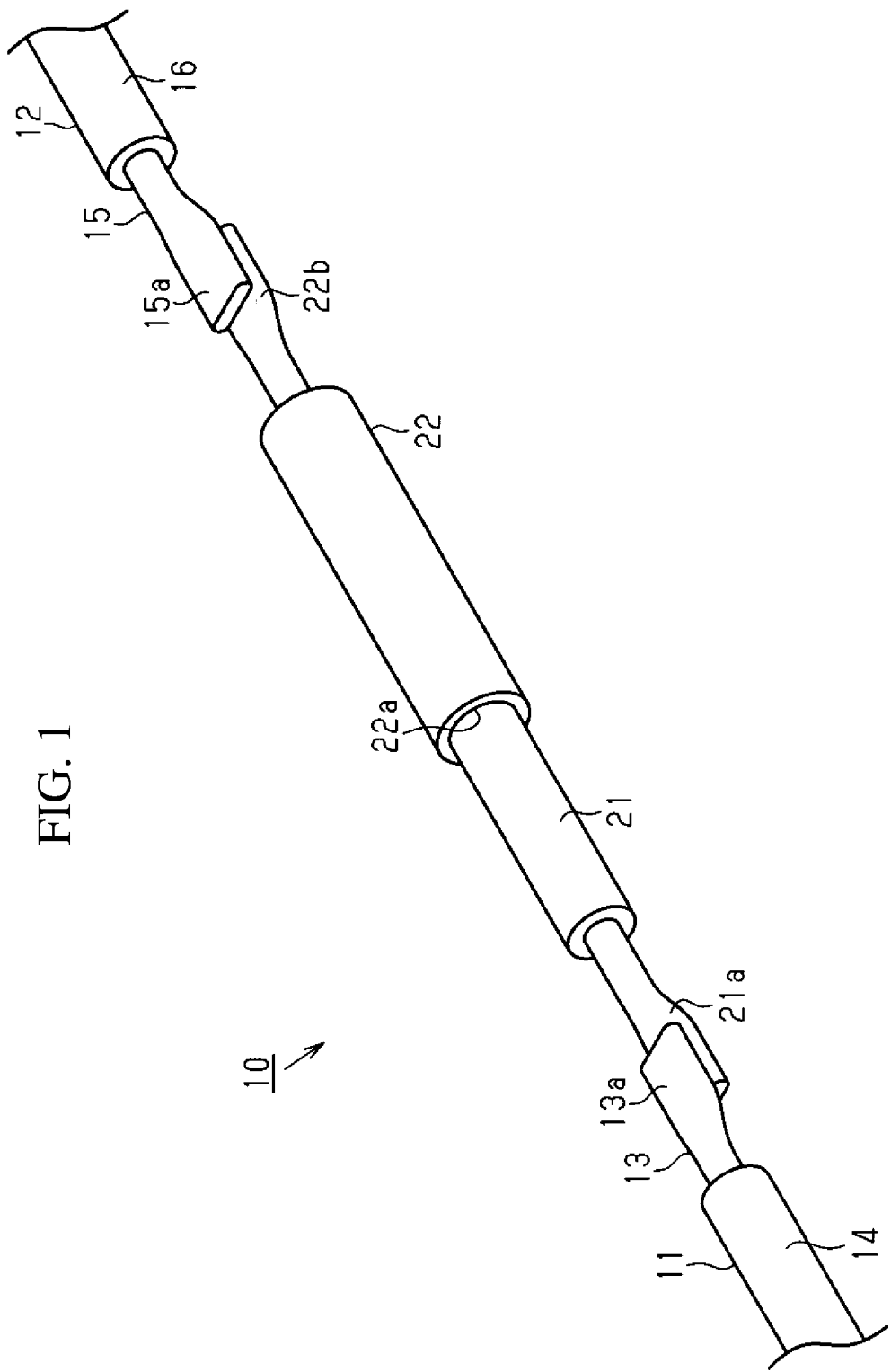
FIG. 1 is a perspective view of a wire harness according to an embodiment.

Hereinafter, an embodiment of a wire harness will be described with reference to FIGS. 1 to 3. Note that in the drawings, for the sake of ease of description, the configuration may be partially exaggerated or simplified. Furthermore, dimensional ratios between the constituent elements may be different from those in the actual configuration.

As shown in FIG. 1, a wire harness 10 has a single core wire 21 as a cylindrical conductor that is connected to a first twisted wire 11 as a first flexible conductive wire, and a conductive pipe 22 as a tubular conductor that is connected to a second twisted wire 12 as a second flexible conductive wire, which is different from the first twisted wire 11. Note that the single core wire 21 and the conductive pipe 22 in this embodiment are configured to, for example, connect an unshown high-pressure battery arranged in a vehicle rear portion and an unshown inverter arranged in a vehicle front portion, in a drive motor-attached vehicle such as a hybrid car and an electric vehicle, and are arranged so as to extend under a floor of the vehicle. The wire harness 10 may include two subsets of the first twisted wire 11, the second twisted wire 12, the single core wire 21, and the conductive pipe 22 respectively corresponding to a plus side path and a minus side path between the high-pressure battery and the inverter. Note that the term "high-pressure battery" as used in this specification refers to a battery that can supply several hundred volts of voltage to a drive motor. Also, the term "inverter" as used in this specification refers to an inverter configured to generate alternating current from direct current of a high-pressure battery, and to supply the alternating current to the drive motor.

Figure 2:
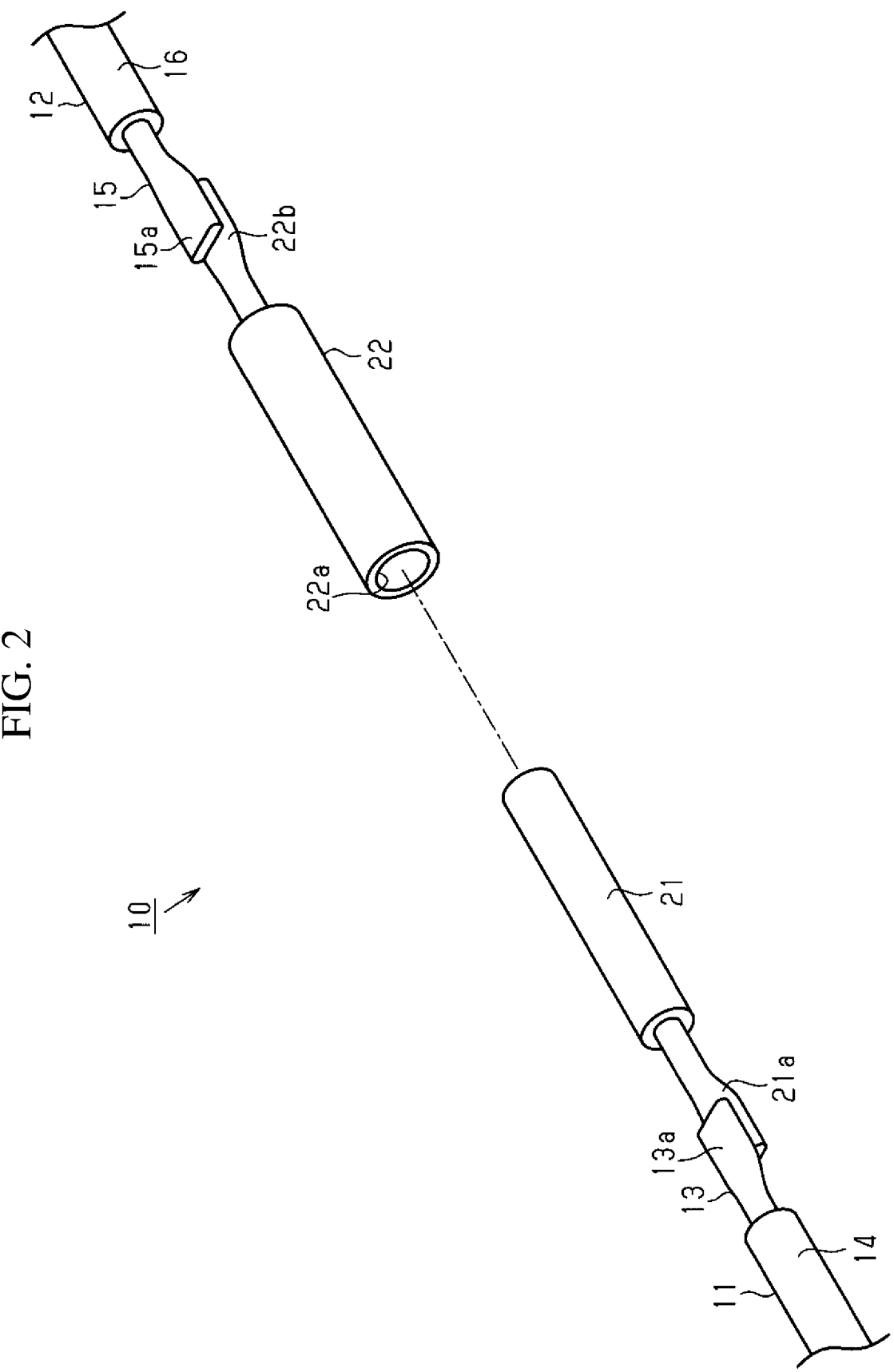
FIG. 2 is an exploded perspective view of the wire harness in FIG. 1.
Figure 3:
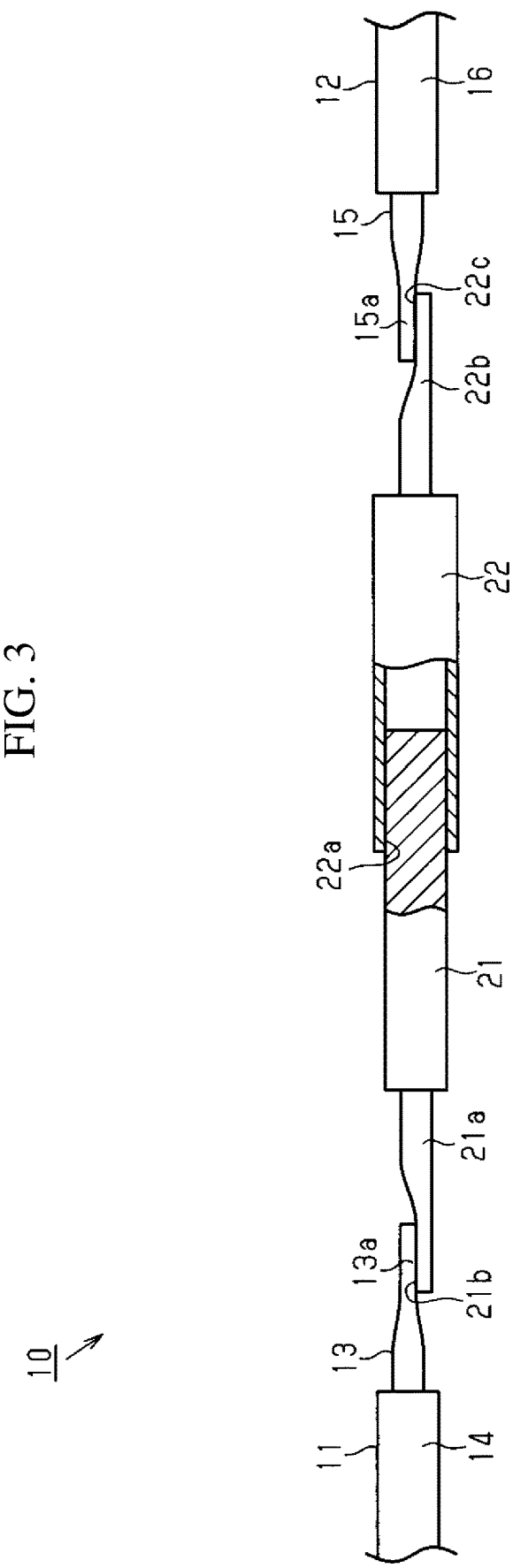
FIG. 3 is a partially cutaway front view of the wire harness in FIG. 1.

As shown in FIGS. 1 to 3, the first twisted wire 11 has a core wire 13 that includes a plurality of element wires, and an insulating coating 14 that coats the core wire 13. The core wire 13 of the first twisted wire 11 is constituted, for example, by element wires made of aluminum or an aluminum alloy. One end of the first twisted wire 11 is electrically connected to, for example, an unshown high-pressure battery. At the other end of the first twisted wire 11, the core wire 13 is exposed from the coating 14. The plurality of exposed element wires of the core wire 13 are welded and integrated to form, for example, a joining block portion 13a substantially in the shape of a rectangular solid.

As shown in FIGS. 1 to 3, the second twisted wire 12 has a configuration substantially similar to that of the first twisted wire 11, and has a core wire 15 that includes a plurality of element wires, and an insulating coating 16 that coats the core wire 15. The core wire 15 of the second twisted wire 12 is constituted, for example, by an element wire made of aluminum or an aluminum alloy. At one end of the second twisted wire 12, the core wire 15 is exposed from the coating 16. The plurality of exposed element wires of the core wire 15 are welded and integrated to form, for example, a joining block portion 15a substantially in the shape of a rectangular solid. The other end of the second twisted wire 12 is electrically connected to, for example, an unshown inverter.

As shown in FIGS. 1 to 3, the single core wire 21 is constituted by a substantially cylindrical conductor. The single core wire 21 is made of, for example, aluminum or an aluminum alloy. One end of the single core wire 21 is collapsed into a flat plate shape to form a collapsed portion 21a. A step in the radial direction is formed between the collapsed portion 21a and the portion of the single core wire 21 other than the collapsed portion 21a. The collapsed portion 21a has a flat joining face 21b to which the first twisted wire 11 is to be joined. The collapsed portion 21a is formed, for example, with the following Method. First, one end of the single core wire 21 is placed on a clamping jig on which one end of the single core wire 21 can be placed. A pair of restricting walls have been formed on the clamping jig so that one end of the single core wire 21 is sandwiched in the width direction. Then, a flattening jig is lowered from above the one end of the single core wire 21 (the side opposite to the clamping jig), and the one end of the single core wire 21 is restricted from stretching in the width direction as it is flattened between the clamping jig and the flattening jig, and thus the collapsed portion 21a is formed.

The collapsed portion 21a that is one end of the single core wire 21 is electrically connected at the joining face 21b to the joining block portion 13a of the first twisted wire 11. There is no particular limitation on the connection method, but examples thereof include ultrasonic welding and laser welding. Furthermore, there may be one welding point, or there may be a plurality of welding points. The other end of the single core wire 21 is electrically connected to the conductive pipe 22.

As shown in FIGS. 1 and 2, the conductive pipe 22 is formed, for example, substantially in the shape of a bottomed cylinder having an opening 22a that is open at one end. The conductive pipe 22 has an inner diameter that is substantially the same as, or larger than, the outer diameter of the single core wire 21, and the single core wire 21 can be inserted into the conductive pipe 22. As indicated by the broken line in FIG. 2, the single core wire 21 and the conductive pipe 22 are coaxially arranged.

Furthermore, the conductive pipe 22 is made of, for example, aluminum or an aluminum alloy. A connecting portion 22b that is to be connected to the second twisted wire 12 is formed in one piece with the other end that is the bottom of the conductive pipe 22, continuously from the other end. The connecting portion 22b has a configuration substantially similar to that of the collapsed portion 21a, and is formed by collapsing the tubular portion at the other end of the conductive pipe 22 into a flat plate shape. The connecting portion 22b is bent so as to form a step in the radial direction from the portion of the conductive pipe 22 other than the connecting portion 22b. The connecting portion 22b has a flat joining face 22c to which the second twisted wire 12 is to be joined. At the connecting portion 22b, the opening of the conductive pipe 22 is substantially closed. The connecting portion 22b is electrically connected at the joining face 22c to the joining block portion 15a of the second twisted wire 12. There is no particular limitation on the connection method, but examples thereof include ultrasonic welding and laser welding. Furthermore, there may be one welding point, or there may be a plurality of welding points.

The single core wire 21 and the conductive pipe 22 are electrically connected to each other through laser welding in a state in which the single core wire 21 is fitted (inserted) into the conductive pipe 22. It is possible to adjust the length of the assembly of the single core wire 21 and the conductive pipe 22, by changing, as appropriate, the insertion depth of the single core wire 21 into the conductive pipe 22, for example, according to the specification such as the vehicle type. The insertion depth may be referred to as an axial-direction overlapping length of the inner face of the conductive pipe 22 and the outer face of the single core wire 21. It is preferable that the inner face of the conductive pipe 22 and the outer face of the single core wire 21 are in surface-contact with each other throughout the axial-direction overlapping length. The assembly of the single core wire 21 and the conductive pipe 22 functions as a linear conductive telescopic joint. Before the single core wire 21 and the conductive pipe 22 are fixedly coupled to each other using a fixedly coupling means such as laser welding, the length of the assembly of the single core wire 21 and the conductive pipe 22 can be adjusted by adjusting the insertion depth, After the single core wire 21 and the conductive pipe 22 are fixedly coupled to each other in a state in which the insertion depth has been adjusted, the insertion depth cannot be adjusted anymore. There may be one welding point, or there may be a plurality of welding points.

Next, the actions of this embodiment will be described.

According to the wire harness 10 in this embodiment, the single core wire 21 as a cylindrical conductor and the conductive pipe 22 as a tubular conductor are arranged between the first twisted wire 11 and the second twisted wire 12, so that the high-pressure battery and the inverter are electrically connected to each other. The distance between the first twisted wire 11 and the second twisted wire 12 may vary, for example, according to the specification such as the vehicle type, but it is possible to conform to the variations by changing the insertion depth of the single core wire 21 into the conductive pipe 22.

Next, the effects of this embodiment will be described.

(1) The single core wire 21 is fitted into the conductive pipe 22, and thus it is possible to adjust the length of the assembly of the single core wire 21 and the conductive pipe 22 by changing the insertion depth of the single core wire 21 into the conductive pipe 22. Accordingly, the length of the wire harness 10 can be adjusted with ease.

(2) Both the number of single core wires 21 and the number of conductive pipes 22 between the first twisted wire 11 and the second twisted wire 12 are one, and thus an increase in the number of parts of the wire harness 10 can be suppressed.

(3) The connecting portion 22b that is the other end of the conductive pipe 22 has a flat joining face 22c to which the second twisted wire 12 is to be joined, and thus the connection with the twisted wire 12 can be improved.

(4) The single core wire 21 is a solid member, and thus the structure of the cylindrical conductor can be made simple.

(5) The wire harness 10 is suitable for use in a vehicle including a linear arrangement portion. For example, the assembly of the single core wire 21 and the conductive pipe 22 can be arranged in a linear arrangement portion. The length of the linear arrangement portion in a vehicle may vary according to the specification such as the vehicle type, but it is possible to suitably use the wire harness 10 in conformity with the variations of the length of the linear arrangement portion, by changing the insertion depth of the single core wire 21 into the conductive pipe 22. Furthermore, the connection of the wire harness 10 with a vehicle electrical device such as a high-pressure battery and an inverter can be maintained through the first twisted wire 11 and the second twisted wire 12, and, at the same time, the wire harness 10 can be arranged with ease in a linear arrangement portion in a vehicle, by using the assembly of the single core wire 21 and the conductive pipe 22.

(6) The length of the assembly of the single core wire 21 and the conductive pipe 22 can be adjusted, for example, when producing the wire harness 10. However, it is also possible to adjust the length of the assembly of the single core wire 21 and the conductive pipe 22 when arranging the wire harness 10 in a vehicle. For example, it is possible to keep the length of the assembly of the single core wire 21 and the conductive pipe 22 at an adjusted desired length, by changing the insertion depth of the single core wire 21 into the conductive pipe 22 in a state in which the wire harness 10 is temporarily arranged in a vehicle, and fixedly coupling the single core wire 21 and the conductive pipe 22, for example, using a fixedly coupling means such as spot welding.

Note that the foregoing embodiment may be modified as follows.

In the foregoing embodiment, the single core wire 21 is constituted by one conductor, but, for example, the outer circumference of the single core wire 21 may be coated by an insulating coating at portions other than the connecting point between the single core wire 21 and the first twisted wire 11 and the connecting point between the single core wire 21 and the conductive pipe 22.

The outer circumference of the conductive pipe 22 may be coated by an insulating coating at portions other than the connecting point between the conductive pipe 22 and the second twisted wire 12 and the connecting point between the conductive pipe 22 and the single core wire 21.

In the foregoing embodiment, the single core wire 21 as a cylindrical conductor is a solid member. However, there is no limitation to this, and it is also possible that the cylindrical conductor is a hollow conductor whose inside has a hollow space.

Figure 4:
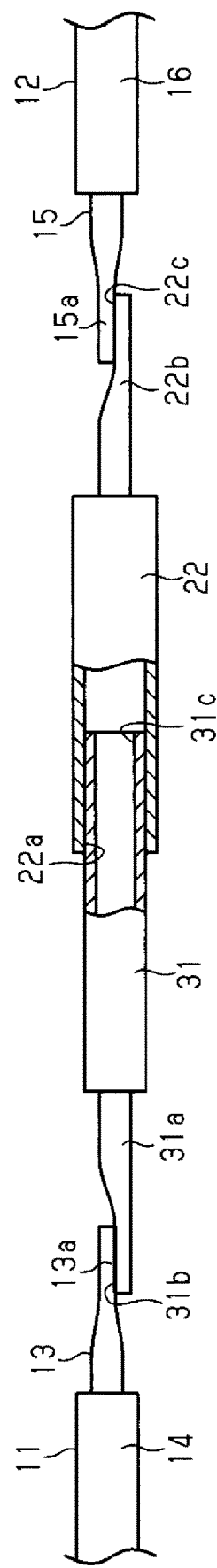
FIG. 4 is a partially cutaway front view of a wire harness according to a first modified example.

For example, as shown in FIG. 4, it is also possible to use a tubular conductive pipe 31 as a cylindrical conductor whose inside has a hollow space. The conductive pipe 31 is formed in the shape of a bottomed tube having an outer diameter that is smaller than the diameter (inner diameter) of the opening 22a of another conductive pipe 22, A connecting portion 31a that is to be connected to the first twisted wire 11 is formed in one piece with the bottom that is one end of the conductive pipe 31, continuously from the one end, as in the case of the connecting portion 22b of the conductive pipe 22. The connecting portion 31a is formed by collapsing the tubular portion on the bottom side of the conductive pipe 31 into a flat plate shape. A step in the radial direction is formed between the connecting portion 31a and the portion of the conductive pipe 31 other than the connecting portion 31a. The connecting portion 31a has a flat joining face 31b to which the first twisted wire 11 is to be joined. At the connecting portion 31a, the opening on the bottom side of the conductive pipe 31 is substantially closed. The connecting portion 31a is electrically connected at the joining face 31b to the joining block portion 13a of the first twisted wire 11. Note that there is no particular limitation on the connection method, but examples thereof include ultrasonic welding and laser welding. Furthermore, there may be one welding point, or there may be a plurality of welding points.

An opening 3k at the other end of the conductive pipe 31 is electrically connected to the conductive pipe 22, for example, through laser welding in a state in which the conductive pipe 31 is fitted (inserted) into the conductive pipe 22 so as to be positioned inside the opening 22a of the conductive pipe 22. Note that there may be one welding point, or there may be a plurality of welding points.

If a hollow conductive pipe 31 as a cylindrical conductor is used as described above, the surface area can be increased, and thus the heat dissipation can be improved. Furthermore, the weight can be reduced, for example, compared with a case in which the single core wire 21 with the same diameter is used. Furthermore, if the cross-sectional area is similar to that of the single core wire 21, the rigidity of the conductive pipe 31 can be increased, According to the wire harness 10 in the foregoing embodiment, one single core wire 21 and one conductive pipe 22 are arranged between the first twisted wire 11 and the second twisted wire 12. However, there is no limitation to this.

For example, it is also possible that a plurality of single core wires and one conductive pipe 22 are arranged between the first twisted wire 11 and the second twisted wire 12. As an example thereof, the configuration shown in FIG. 5 is conceivable.

Figure 5:
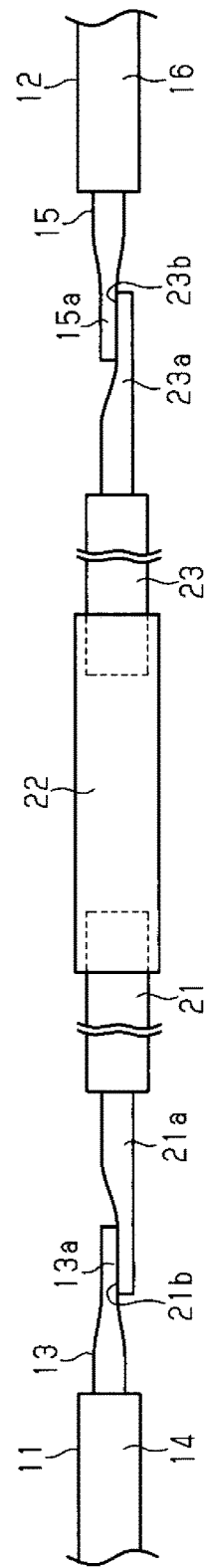
FIG. 5 is a front view of a wire harness according to a second modified example.

As shown in FIG. 5, from the first twisted wire 11 side, the single core wire 21, the conductive pipe 22, a single core wire 23, and the second twisted wire 12 are connected in that order. The first twisted wire 11, the single core wire 21, and the second twisted wire 12 of this example have configurations similar to those in the foregoing embodiment. The conductive pipe 22 of this example is formed in the shape of a cylinder whose both ends are open. The single core wire 23 of this example has a configuration substantially similar to that of the single core wire 21, and is constituted by a substantially cylindrical conductor. The single core wire 23 is made of, for example, aluminum or an aluminum alloy. One end of the single core wire 23 is inserted into an opening at the other end of the conductive pipe 22, and the single core wire 23 and the conductive pipe 22 are electrically connected to each other through laser welding. The other end of the single core wire 23 is collapsed into a flat plate shape to form a collapsed portion. 23a. A step in the radial direction is formed between the collapsed portion 23a and the portion of the single core wire 23 other than the collapsed portion 23a. Furthermore, the collapsed portion 23a has a flat joining face 23b to which the second twisted wire 12 is to be joined. The collapsed portion 23a that is the other end of the single core wire 23 is electrically connected at the joining face 23b to the joining block portion 15a of the second twisted wire 12. There is no particular limitation on the connection method, but examples thereof include ultrasonic welding and laser welding. Furthermore, there may be one welding point, or there may be a plurality of welding points.

The single core wires 21 and 23 as cylindrical conductors are arranged respectively at both ends of the conductive pipe 22 as a tubular conductor as described above, and thus the length of the assembly of the conductive pipe 22 and the single core wires 21 and 23 can be adjusted at both ends of the conductive pipe 22. Accordingly, the degree of freedom in the design of the wire harness and/or a vehicle in which the wire harness is arranged can be improved.

Furthermore, as an alternative plan, it is also possible that a plurality of single core wires 21 and a plurality of conductive pipes 22 are arranged between the first twisted wire 11 and the second twisted wire 12.

Furthermore, as an alternative plan, it is also possible that one single core wire 21 and a plurality of conductive pipes 22 are arranged between the first twisted wire 11 and the second twisted wire 12. As an example thereof, the configuration shown in FIG. 6 is conceivable.

Figure 6:
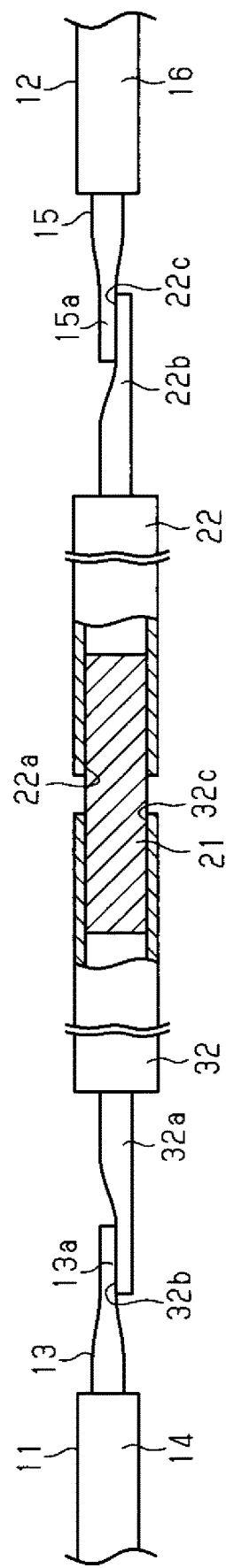
FIG. 6 is a partially cutaway front view of a wire harness according to a third modified example.

As shown in FIG. 6, from the first twisted wire 11 side, a conductive pipe 32, the single core wire 21, and the conductive pipe 22 are connected in that order. The first twisted wire 11, the conductive pipe 22 and the second twisted wire 12 of this example have configurations similar to those in the foregoing embodiment. In the case of this example, the conductive pipe 32, which is different from the conductive pipe 22, is arranged between the first twisted wire 11 and the single core wire 21.

The conductive pipe 32 has a configuration substantially similar to that of the conductive pipe 22, and is formed in the shape of a bottomed tube, That is to say; a connecting portion 32a that is to be connected to the first twisted wire 11 is formed in one piece with the bottom that is one end of the conductive pipe 32, continuously from the one end, as in the case of the connecting portion 22b of the conductive pipe 22. The connecting portion 32a is formed by collapsing the tubular portion on the bottom side of the conductive pipe 32 into a flat plate shape. A step in the radial direction is formed between the connecting portion 32a and the portion of the conductive pipe 32 other than the connecting portion 32a. The connecting portion 32a has a flat joining face 32b to which the first twisted wire 11 is to be joined. At the connecting portion 32a, the opening on the bottom side of the conductive pipe 32 is substantially closed. The connecting portion 32a is electrically connected at the joining face 32b to the joining block portion 13a of the first twisted wire 11. There is no particular limitation on the connection method, but examples thereof include ultrasonic welding and laser welding. Furthermore, there may be one welding point, or there may be a plurality of welding points.

Furthermore, contrary to the single core wire in the foregoing embodiment, the single core wire 21 of this example does not have the collapsed portion 21a. That is to say, the single core wire 21 of this example is formed in the shape of a simple cylinder, wherein one end thereof is inserted into an opening 32c of the conductive pipe 32, and the other end is inserted into the opening 22a of the conductive pipe 22. The one end of the single core wire 21 and the conductive pipe 32 are electrically connected to each other, for example, through laser welding, and the other end of the single core wire 21 and the conductive pipe 22 are electrically connected to each other, for example, through laser welding. Note that there may be one welding point, or there may be a plurality of welding points.

In the foregoing example, a solid single core wire 21 is used as a cylindrical conductor. However, there is no limitation to this.

Figure 7:
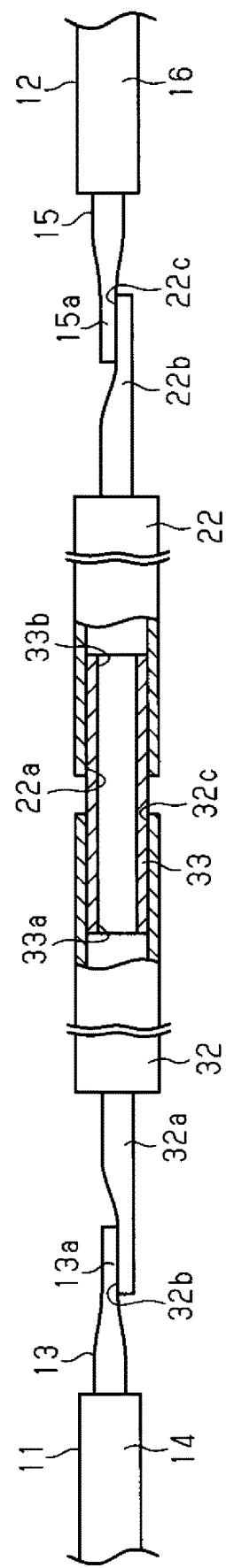
FIG. 7 is a partially cutaway front view of a wire harness according to a fourth modified example.

As shown in FIG. 7, it is also possible to use a hollow conductive pipe 33 as a cylindrical conductor. The conductive pipe 33 is formed substantially in the shape of a cylinder whose both ends have openings 33a and 33b. The conductive pipe 33 is electrically connected to the conductive pipe 32, for example, through laser welding in a state in which one opening 33a is fitted (inserted) into the conductive pipe 32 so as to be positioned inside the opening 32c of the conductive pipe 32. The conductive pipe 33 is electrically connected to the conductive pipe 22, for example, through laser welding in a state in which the other opening 33h is fitted (inserted) into the conductive pipe 22 so as to be positioned inside the opening 22a of the conductive pipe 22. Note that there may be one welding point, or there may be a plurality of welding points. Furthermore, the connection method is not limited to laser welding, and an electrical connection may be established using other connection methods such as ultrasonic welding or crimping.

In the configuration shown in FIG. 7, the conductive pipe 33 is fitted (inserted) into other conductive pipes 32 and 22. However, there is no limitation to this. For example, it is also possible that the conductive pipe 33 is fitted onto other conductive pipes 32 and 22.

In the foregoing embodiment, the first twisted wire 11 and the collapsed portion 21a, which is a first end on one end side of the single core wire 21, are electrically connected to each other through direct connection in a mechanical manner. However, there is no limitation to this.

For example, it is also possible that the first twisted wire 11 and the single core wire 21 are electrically connected to each other via another conductive member interposed between the first twisted wire 11 and the single core wire 21.

In the foregoing embodiment, the second twisted wire 12 and the other end of the conductive pipe 22 are electrically connected to each other through direct connection in a mechanical manner. However, there is no limitation to this.

For example, it is also possible that the second twisted wire 12 and the conductive pipe 22 are electrically connected to each other via another conductive member interposed between the second twisted wire 12 and the conductive pipe 22.

In the foregoing embodiment, it is also possible that the conductive pipe 22 and the second twisted wire 12 are connected t© each other in a state in which the second twisted wire 12 is inserted (fitted) into the conductive pipe 22. At this time, the conductive pipe 22 and the second twisted wire 12 may be connected using various methods. Examples thereof include laser welding, ultrasonic welding, and crimping.

In the foregoing embodiment, the conductive pipe 22 is in the shape of a cylinder, but the shape may be changed to an elliptic cylindrical shape or a polygonal cylindrical shape.

In the foregoing embodiment, the element wires of the core wire 13 of the first twisted wire 11, the element wires of the core wire 15 of the second twisted wire 12, the single core wire 21, and the conductive pipe 22 are made of aluminum or an aluminum alloy, but the materials may be changed as appropriate. For example, it: is also possible that the element wires of the core wire 13 of the first twisted wire 11 and the element wires of the core wire 15 of the second twisted wire 12 are made of copper or a copper alloy.

In the foregoing embodiment, the wire harness 10 is configured to connect a high-pressure battery and an inverter, but may be configured to connect other devices, such as an inverter and a drive motor. In the case of a wire harness that connects an inverter and a drive motor, for example, the power source applies three-phase electric power, and thus the assembly of the single core wire 21 and the conductive pipe 22 may be used in all or some of the three conductive paths.

Furthermore, the devices are not limited to high-pressure (high-voltage) devices such as a high-pressure battery. That is to say, the wire harness can be widely applied to wire harnesses that connect at least two electrical devices that are electrically connected to each other.

Although not specifically described in the foregoing embodiment, it is also possible to use a protective member that covers the connecting point between the first twisted wire 11 and the single core wire 21 or the connecting point between the second twisted wire 12 and the conductive pipe 22. Examples of the protective member include a heat shrinkable tube that coats the connecting point, and tape that is wound around and coats the connecting point, but other methods may be also used.

Although not specifically described in the foregoing embodiment, it is also possible to use an external cover that protects the first twisted wire 11, the second twisted wire 12, the single core wire 21, the conductive pipe 22, and the like. Examples of the external cover include a metal or resin pipe, and a composite pipe in which a conductive shield layer is laminated on or embedded in a non-metal pipe main body In the foregoing embodiment and the modified examples, the first twisted wire 11 is used as a first flexible conductor, and the second twisted wire 12 is used as second flexible conductor. However, the flexible conductors are not limited to twisted wires. For example, it is also possible to use a tubular braided wire member, a flat plate-like braided wire member, or the like, as the flexible conductors.

In the foregoing embodiment, the single core wire 21 and the conductive pipe 22 are electrically connected to each other through laser welding. However, there is no limitation to this, and the connection method may be changed as appropriate. For example, it is also possible that the single core wire 21 and the conductive pipe 22 are electrically connected to each other through ultrasonic welding, crimping, or the like. Furthermore, as another example, it is also possible to use a connection method in which an object to be processed is plastically deformed while a jig and the object to be processed are rotated relative to each other. More specifically, while the conductive pipe 22 that is positioned on the outer side and that is to be processed and a jig are rotated relative to each other, the jig is brought into contact with the outer side of the conductive pipe 22 and plastically deforms the conductive pipe 22 such that the diameter of the conductive pipe 22 is reduced, so that the inner face of the conductive pipe 22 at the portion where the diameter has been reduced and the single core wire 21 are electrically connected to each other. This method is also applicable to the configurations as shown in FIGS. 4 to 7. Examples of the plastically deformation method that can be used for such connection include spinning, swaging, and the like.

The foregoing embodiment and the modified examples may be combined as appropriate.

The present disclosure encompasses the following configurations. The reference numerals of the constituent elements of the embodiment are indicated not for limitation but for facilitating the understanding.

[Note 1]

A wire harness (10) that can be arranged in a vehicle, including:

a first flexible wire (11);

a second flexible wire (12) that is separate from the first flexible wire (11) in an axial direction; and a linear conductive telescopic joint (21, 22; 21, 22, 23; 22, 32, 33) arranged between the first flexible wire (11) and the second flexible wire (12), and including a first end (21a) that is directly connected to the first flexible wire (11) and a second end (22h) that is directly connected to the second flexible wire (12).

[Note 2]
The wire harness (10) according to Note 1,
wherein the linear conductive telescopic joint (21, 22) includes:
a first linear elongated member (21) having an outer face; and a second linear elongated member (22) having an inner face that is in surface-contact with the outer face of the first linear elongated member (21) throughout an overlapping length, and
a length of the linear conductive telescopic joint (21, 22) is adjustable by changing the overlapping length.

[Note 3]
The wire harness (10) according to Note 1,
wherein the linear conductive telescopic joint (21, 22, 23) includes:
a plurality of first linear elongated members (21, 23) respectively having outer faces; and
a second linear elongated member (22) having an inner face that is in surface-contact with the outer faces of the plurality of first linear elongated members (21, 23) throughout an overlapping length, and
a length of the linear conductive telescopic joint (21, 22) is adjustable by changing the overlapping length of at least one of the plurality of first linear elongated members (21, 23) and the second linear elongated member (22).

[Note 4]
The wire harness (10) according to Note 1,
wherein the linear conductive telescopic joint (22, 32, 33) includes:
a first linear elongated member (33) having both ends and an outer face; and
a plurality of second linear elongated members (22, 32) having inner faces that are in surface-contact with the outer face of the first linear elongated member (33) throughout an overlapping length at both ends of the first linear elongated member (33), and
a length of the linear conductive telescopic joint (22, 32, 33) is adjustable by changing the overlapping length of at least one of the plurality of second linear elongated members (22, 32) and the first linear elongated member (33).

[Note 5]
The wire harness (10) according to Note 2, further including a fixedly coupling means for fixedly coupling the first linear elongated member (21) and the second linear elongated member (22).

[Note 6]
The wire harness (10) according to Note 2, wherein the first linear elongated member (21) and the second linear elongated member (22) are coaxially arranged.

[Note 7]
The wire harness (10) according to Note 2, wherein the first flexible wire (11) includes a first joining block portion (13a) that is directly connected to the first end (21a) of the linear conductive telescopic joint (21, 22), and the second flexible wire (12) includes a second joining block portion (15a) that is directly connected to the second end (22b) of the linear conductive telescopic joint (21, 22).

[Note 8]
The wire harness (10) according to any one of Notes 1 to 7, wherein the first flexible wire (11) extends from the linear conductive telescopic joint (21, 22; 21, 22, 23; 22, 32, 33) to a first end of the wire harness (10).

[Note 9]
The wire harness (10) according to any one of Notes 1 to 8, wherein the second flexible wire (12) extends from the linear conductive telescopic joint (21, 22; 21, 22, 23; 22, 32, 33) to a second end of the wire harness (10).

[Note 10]
The wire harness (10) according to any one of Notes 1 to 9, wherein the first linear elongated member (21, 23, 33) includes a cylindrical or tubular portion having a first outer diameter.

[Note 11]
The wire harness (10) according to any one of Notes 1 to 10, wherein the second linear elongated member (22; 32) includes a tubular portion having a second inner diameter.

It will be appreciated by those skilled in the art that the present disclosure may be embodied in other specific modes without departing from the technical idea thereof. For example, some of constituent elements described in the embodiment (or one or a plurality modes thereof) may be omitted or combined.

The invention claimed is:

1. A wire harness that can be arranged in a vehicle, the wire harness comprising:
a cylindrical conductor whose first end is electrically connected to a first flexible conductor that is flexible; and
a tubular conductor that is electrically connected to the cylindrical conductor in a state in which a second end of the cylindrical conductor is fitted into an opening at a first end of the tubular conductor, wherein
the first end of the cylindrical conductor is collapsed to form a flat plate shape, an outer face of the flat plate shape has a flat joining face, and the first end of the cylindrical conductor is joined at the flat joining face to a core wire of the first flexible conductor, and
the tubular conductor and the cylindrical conductor are configured such that a length of the wire harness is adjustable by changing an insertion depth of the cylindrical conductor into the tubular conductor.

2. The wire harness according to claim 1, wherein the first flexible conductor is connected to the first end of the cylindrical conductor, and a second flexible conductor that is flexible and is different from the first flexible conductor, is connected to a second end of the tubular conductor.

3. The wire harness according to claim 2, wherein a connector having a flat joining face to which the second flexible conductor is to be joined is formed at the second end of the tubular conductor.

4. The wire harness according to claim 1, wherein an opening at a second end of the tubular conductor is electrically connected to another cylindrical conductor, which is different from the cylindrical conductor, in a state in which a first end of the another cylindrical conductor is fitted into the opening.

5. The wire harness according to claim 4, wherein a second flexible conductor, which is different from the first flexible conductor, is connected to a second end of the another cylindrical conductor.

6. The wire harness according to claim 1, wherein the cylindrical conductor is a solid member.

7. The wire harness according to claim 1, wherein the cylindrical conductor is a hollow member.

8. The wire harness according to claim 1, wherein another tubular conductor, which is different from the tubular conductor, is arranged between the cylindrical conductor and the first flexible conductor, and the cylindrical conductor and the first flexible conductor are electrically connected to each other in a state in which the first flexible conductor is connected to a first end of the another tubular conductor and the first end of the cylindrical conductor is fitted into an opening at a second end of the another tubular conductor.

\* \* \* \* \*